United States Patent [19]

Matthews

[11] Patent Number: 4,885,510

[45] Date of Patent: Dec. 5, 1989

[54] BEAM CURRENT COMPENSATED VERTICAL SIZE CONTROL

[75] Inventor: Lloyd E. Matthews, Berwyn, Ill.

[73] Assignee: Zenith Electronics Corporation, Glenview, Ill.

[21] Appl. No.: 230,225

[22] Filed: Aug. 8, 1988

[51] Int. Cl.[4] ............................................. H01J 29/70
[52] U.S. Cl. ..................................... 315/411; 315/387
[58] Field of Search ............... 315/387, 389, 399, 403, 315/386, 411

[56] References Cited

U.S. PATENT DOCUMENTS 4,147,963 4/1979 Shiotani ............................. 315/387
4,645,987 2/1987 Kiteley et al. ...................... 315/389
4,649,325 3/1987 Guerin et al. ...................... 315/383

Primary Examiner—Thomas H. Tarcza
Assistant Examiner—Gregory C. Issing

[57] ABSTRACT

A compensation circuit for maintaining a CRT vertical raster size substantially constant with beam current changes includes a sensing resistor connected in series with the high voltage winding. The sensing resistor develops an input bias for a compensation transistor that has its output circuit connected across the vertical size control. Increases in beam current are reflected in increases in current in the high voltage winding which cause the compensation transistor to conduct more heavily and supply more current to the vertical size control. The size control is part of the discharge circuit of the vertical timing capacitor and the increased current from the transistor reduces the discharge time of the timing capacitor. Consequently the peak to peak voltage of the vertical current ramp is decreased.

1 Claim, 1 Drawing Sheet

U.S. Patent  Dec. 5, 1989  4,885,510
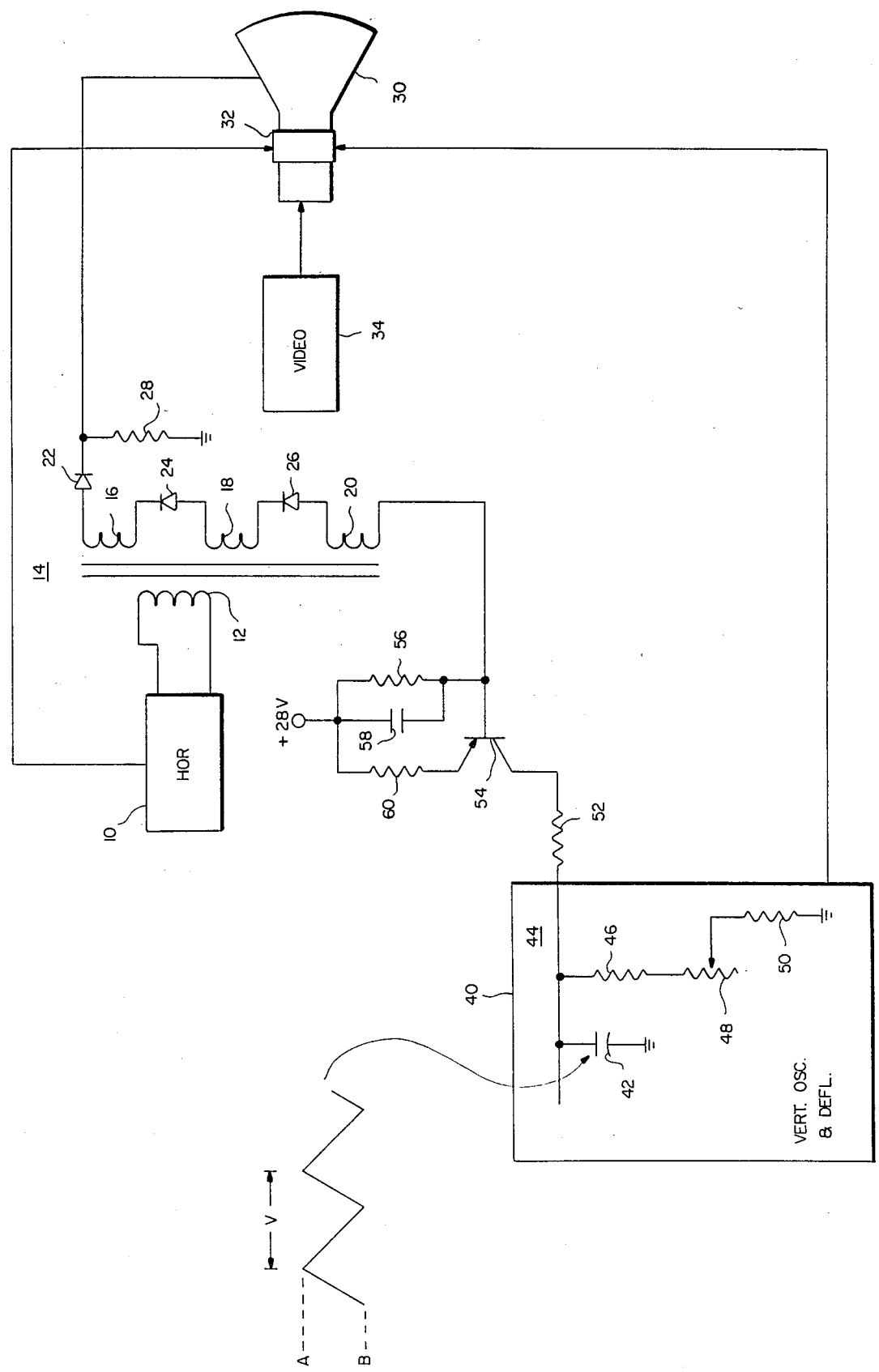

BEAM CURRENT COMPENSATED VERTICAL SIZE CONTROL

BACKGROUND OF THE INVENTION

This invention relates in general to cathode ray tube (CRT) defelection systems and particularly to a vertical size compensation circuit for a CRT.

In conventional flyback type CRT deflection systems, horizontal and vertical oscillators in the respective deflection circuits provide deflection voltages and currents to a deflection yoke that is situated on the neck of the CRT. The electromagnetic field established by the yoke is effective for scanning the electron beam across the face of the CRT to produce a raster. High voltage means are also incorporated for developing the high direct current potential required for operation of the CRT. As is well known, the effectiveness of the electromagnetic deflection signals in deflecting the electron beam (and hence the size of the resulting raster produced) is related to the high voltage, which in turn is a function of the CRT beam current. The problem is that as the high voltage fluctuates, the raster size fluctuates in an inverse relationship since the effectiveness of the deflection signal is changed. Many circuits in the prior art use regulators for attempting to maintain the high voltage applied to the CRT constant.

The present circuit is directed to a compensation circuit for maintaining the vertical size of the raster substantially constant despite changes in beam current loading of the CRT. This is readily and simply accomplished in the invention by sensing the high voltage energy (beam current) supplied to the CRT and varying the discharge rate of the vertical timing capacitor in accordance therewith to proportionally change the peak to peak vertical deflection voltage.

OBJECTS OF THE INVENTION

A principal object of the invention is to provide a novel compensated vertical deflection circuit.

Another object of the invention is to provide a deflection circuit for producing a raster with a stabilized vertical size.

BRIEF DESCRIPTION OF THE DRAWINGS

These and other objects and advantages of the invention will be apparent upon reading the following description in conjunction with the drawing, the single FIG. which is a partial schematic diagram of a vertical compensation circuit constructed in accordance with the invention.

DESCRIPTION OF THE PREFERRED EMBODIMENT

Referring to the FIG., a horizontal source of oscillation and deflection voltage 10 is coupled to a winding 12 on a high voltage transformer 14. The transformer includes three high voltage secondary windings 16, 18 and 20 that, with high voltage diodes 22, 24 and 26, are connected in a voltage tripler arrangement. The cathode of diode 22 provides the high voltage connection to a CRT 30. A bleeder resistor 28 is connected across the high voltage tripler arrangement. In a conventional voltage tripler circuit, the lower terminal of winding 20 is connected to ground potential. With the invention, the lower terminal is lifted from ground and, as will be seen, is used to supply a sensing means for sensing the high voltage current supplied to CRT 30.

A vertical oscillator and deflection circuit 40, of generally conventional construction, includes a timing capacitor 42 across which a vertical size control 44 is connected. The vertical size control 44 includes a resistor 46 that is connected in series with a variable resistor 48, which in turn is connected in series with a resistor 50 that is returned to ground potential. A conventional yoke 32 on CRT 30 is supplied with appropriate deflection signals from horizontal circuit 10 and vertical circuit 40. A source of video information 34 is also connected to CRT 30 and the electron beam (not shown) in CRT 30 is modulated as a function of signals from video circuit 34.

The indicated sawtooth shaped waveform that is developed across timing capacitor 42 varies between two levels, A and B. As those skilled in the art will appreciate, level A is determined by the B+ potential applied to the vertical oscillator and level B is determined by the discharge rate of timing capacitor 42. This rate is dependent upon the value of capacitor 42 and the effective resistance in its discharge circuit which comprises the shunt resistance of size control 44. The peak to peak voltage between points A and points B determines the magnitude of the vertical deflection signal applied to yoke 32.

The circuit of the invention consists of a PNP compensating transistor 54 that has its base connected to the lower terminal of high voltage winding 20 and its collector connected, through a resistor 52, to the junction of timing capacitor 42 and size control 44. The base of transistor 54 is connected through a sensing resistor 56 to a +28 volts DC terminal. A capacitor 58 is connected in parallel with sensing resistor 56. The emitter of transistor 54 is connected through a large resistor 60 to the 28 volts DC terminal.

As mentioned, the high voltage applied to CRT 30 changes with changes in CRT beam current. Specifically, it decreases with an increase in the beam current and the deflection current required for full deflection at a high beam current is less than that required at a low beam current. The circuit of the invention adjusts the peak to peak amplitude of the vertical deflection current to compensate for changes in the high voltage in order to maintain the overall vertical raster size substantially constant.

In operation, an increased beam current in the CRT is reflected in an increase in bias voltage developed across sensing resistor 56 which drives transistor 54 more conductive. The current in the emitter-collector circuit of the transistor is established by resistor 60 which is on the order of 4.3 megohms. Resistor 56, on the other hand, is on the order of 5.6 kilohms and capacitor 58 is 0.1 microfarads. Thus, the current flow through resistor 60, the emitter-base path of transistor 54 and resistor 52 is very small relative to the total discharge current of timing capacitor 42 that flows through size control 44. It does however, decrease this discharge current and thereby raises the level B of the vertical sawtooth waveform which decreases the peak to peak amplitude of the vertical sawtooth. The vertical deflection signal is accordingly decreased responsible to increased beam current to maintain the vertical size of the CRT raster constant. The actual value of components required for complete compensation is, of course, a function of the CRT and deflection circuits.

With the invention, the magnitude of the CRT beam current itself is sensed. This arrangement permits a very accurate and responsive signal correction to be made to maintain a constant vertical raster size. It is recognized that numerous changes in the described embodiment of the invention will be apparent to those skilled in the art without departing from its true spirit and scope. The invention is to be limited only as defined in the claims.

What is claimed is:

1. A deflection system comprising:
   a cathode ray tube;
   a high voltage transformer including high voltage tripler windings for supplying high voltage to said cathode ray tube;
   a vertical oscillator and deflection means for supplying a vertical deflection signal to said cathode ray tube and including a timing capacitor and a shunt connected vertical size control resistance for determining the discharge current of said timing capacitor;
   a sensing resistor connected in series with said high voltage tripler windings; and
   a PNP compensating transistor having a base-emitter input circuit including said sensing resistor and a collector-emitter output circuit coupled across said vertical size control resistance for adjusting said discharge current as a function of the current in said sensing resistor.

* * * * *